Oct. 23, 1923.
K. W. BARTLETT
1,471,718
APPARATUS FOR SOFTENING WATER
Filed Jan. 12, 1920
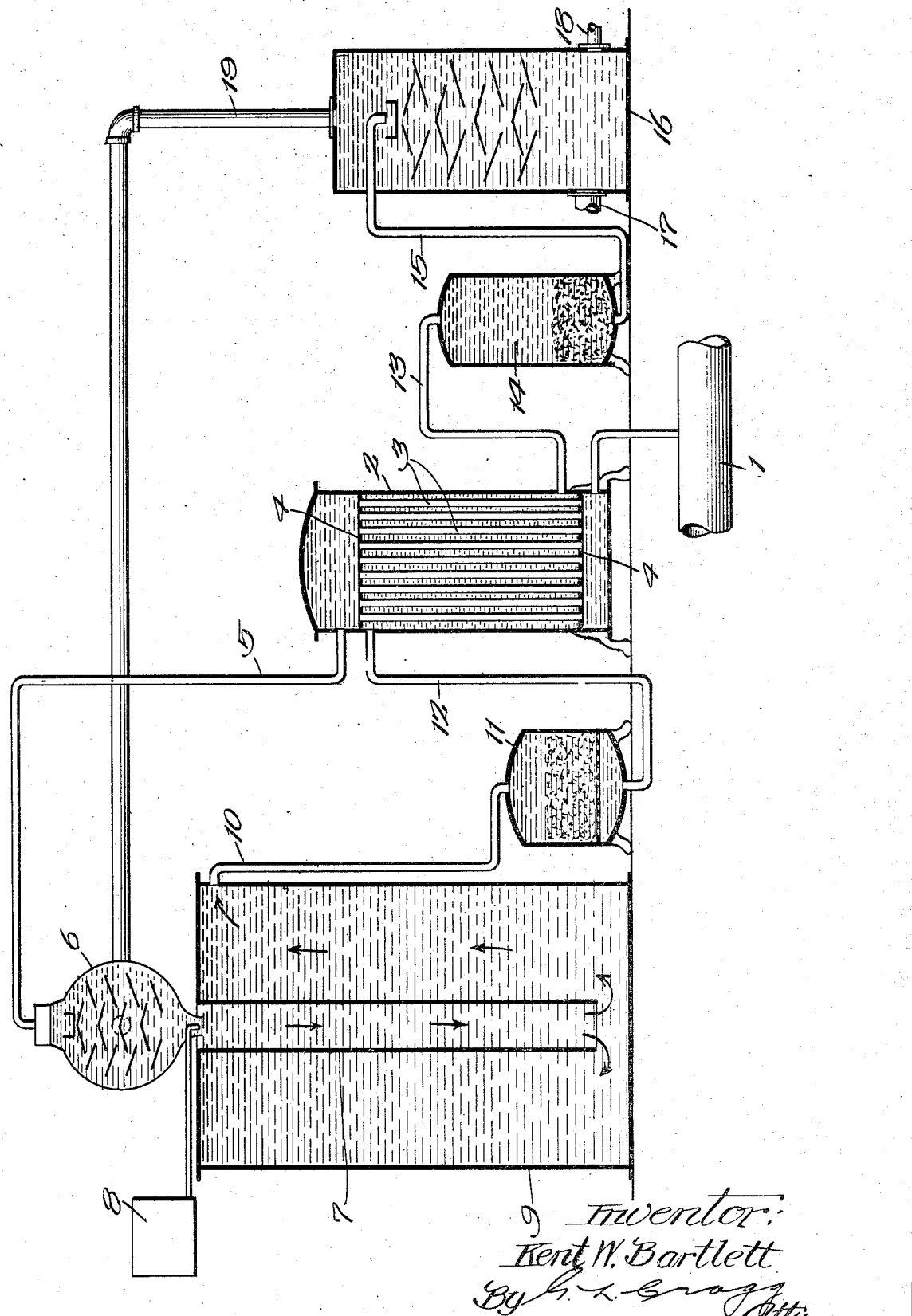

Patented Oct. 23, 1923.

1,471,718

UNITED STATES PATENT OFFICE.

KENT W. BARTLETT, OF HAMMOND, INDIANA.

APPARATUS FOR SOFTENING WATER.

Application filed January 12, 1920. Serial No. 350,969.

*To all whom it may concern:*

Be it known that I, KENT W. BARTLETT, citizen of the United States, residing at Hammond, in the county of Lake and State of Indiana, have invented a certain new and useful Improvement in Apparatus for Softening Water, of which the following is a full, clear, concise, and exact description.

My invention relates to water softening apparatus and employs an intercooler for raising the temperature of hard water preparatory to the partial chemical treatment thereof by lime, soda-ash or other well known precipitating chemical for the purpose of partially removing the hardening ingredients from the water. In my apparatus the hot and partially treated water is returned to another compartment in the intercooler where temperature is imparted therefrom to the incoming hard water, the temperature of the partially treated water being at the same time sufficiently reduced to enable it to be acted upon by some zeolite or other water softening chemical without injury to this chemical, it being understood that the zeolite serves to remove all calcium and magnesium salts to place the water in a suitable softened condition for its purpose. By means of my apparatus there need be no excessive chemical in the water that finds its way to the zeolite machine, this chemical having a deleterious effect on the zeolite.

Hitherto it has been the practice to remove part or all possible calcium and magnesium salts from the water by the addition of hydrate of lime, soda ash or other well known chemicals. In this prior process the water undergoing treatment is cold, it being necessary to use a slight excess of chemical with a resulting reaction that is not so complete that no further reaction may take place after the water leaves the softener on its way to the zeolite machine. The excess of chemical in the water passing to the zeolite machine has a deleterious effect on the zeolite, there being such reaction due to this excess of chemical as to deposit practically insoluble lime and magnesia salts on and in the zeolite whose efficiency is consequently lessened.

I will explain my invention more fully by reference to the accompanying drawing diagrammatically illustrating the preferred form of the equipment.

The water to be softened is taken from any suitable source of supply, as for example a city water main illustrated at 1. This water passes upwardly through an intercooler 2. As illustrated, this intercooler is provided with open ended tubes 3 held in place by perforated head plates 4. These head plates define water receiving spaces at the ends of the intercooler but cut off communication between these spaces and the spaces between the tubes. The water receiving spaces at the ends of the intercooler are connected by the open ended tubes so that water flowing from the pipe 1 will find entry into the water receiving space at one end of the intercooler, will pass through the tubes into the water receiving space and whence it is discharged through the pipe 5 into the heating drum 6 which heats the water to a temperature of, say, 175° F., at which temperature the water is discharged into the tubular column 7 where it becomes intermixed with a chemical, such as lime, soda-ash, or other well known precipitating chemical, added, in slight deficiency, to the same column from a suitable source of chemical supply 8. This chemical partially removes the soluble salts from the water which flows through the column and the tank 9 surrounding this column whence it is discharged by the pipe 10 with the remaining salts therein. This water, with such remaining salts, passes through the filter 11 which serves to remove the matter suspended in the water. After leaving the filter the water passes, by means of the pipe 12, to the space between the head plates 4 and the tubes 3, the cool water flowing from the pipe 1 through these tubes serving to reduce the temperature of the water flowing into the intercooler from the pipe 12 to such a temperature, say 110° F., that it may be subjected to the action of zeolite or other water softening chemical without injuring such chemical while at the same time heat from the water flowing from the pipe 12 is imparted to the water flowing upwardly from the pipe 1 to reduce the amount of heating of this water required of the heater 6 that is necessary to bring the water to suitable temperature, 175° F. or so, to enable the chemical supplied from the chemical source 8 to remove the hardenng salts desired from the water. After being reduced to a safe temperature, the water passes from the intercooler by means of the pipe 13 to the zeolite machine 14 or other container for water softening chemical. The zeolite or water softening chemical substantially removes all the calcium and magnesium salts from the water as it passes through the zeolite machine to the soft water discharge pipe 15. It is customary to heat the softened water to a temperature of say 210° F., in which event the softened water is discharged into the reheater 16 to which heat is supplied through the pipe 17. The soft water is discharged from the reheater through the pipe 18 in condition to be used. Excess heat may be passed from the reheater 16 through the pipe 19 to supply the heater 6 with the heat that may be required further to raise the temperature of the hard water flowing from the intercooler to this heater.

While I have herein shown and particularly described the preferred form of apparatus for practicing the process of my invention I do not wish to be limited to the precise details of construction shown as changes may readily be made without departing from the spirit of my invention, but having thus described my invention I claim as new and desire to secure by Letters Patent the following:—

In water softening apparatus including a source of hard water to be treated, a main heater receiving water from said source, a filter receiving water from said main heater, a water softening device receiving water from said filter, means for utilizing the heat of the water in its passage from the filter to the water softening device to initially heat the hard water as the latter is delivered from its source to the main heater, a reheater below the main heater receiving water from said water softening device, and a connection for conveying heat generated at the reheater to the main heater.

In witness whereof, I hereunto subscribe my name this 30th day of December, A. D., 1919.

KENT W. BARTLETT.